United States Patent [19]

Gessner

[11] Patent Number: 4,983,223
[45] Date of Patent: Jan. 8, 1991

[54] APPARATUS AND METHOD FOR REDUCING SOLVENT VAPOR LOSSES

[75] Inventor: Adolf W. Gessner, Silver Spring, Md.
[73] Assignee: Chenpatents, Silver Spring, Md.
[21] Appl. No.: 426,005
[22] Filed: Oct. 24, 1989
[51] Int. Cl.$^5$ ............................................. B08B 3/08
[52] U.S. Cl. ..................................... 134/25.4; 134/40; 134/76; 134/83; 134/105; 134/108
[58] Field of Search .................... 134/76, 83, 105, 108, 134/25.4, 40

[56] References Cited

U.S. PATENT DOCUMENTS

| | | | |
|---|---|---|---|
| 3,460,990 | 8/1969 | Barday | 134/31 |
| 3,772,082 | 11/1973 | Dunn | 134/10 |
| 4,101,297 | 7/1978 | Uda | 55/43 |
| 4,101,340 | 7/1978 | Rand | 134/11 |
| 4,708,721 | 11/1987 | Ehrler | 55/40 |

FOREIGN PATENT DOCUMENTS

| | | | |
|---|---|---|---|
| 1001934 | 12/1976 | Canada | 134/12 |
| 925031 | 3/1955 | Fed. Rep. of Germany | 134/40 |
| 3242719 | 1/1984 | Fed. Rep. of Germany | 134/40 |
| 2120488 | 6/1987 | Japan | 134/40 |

Primary Examiner—Olik Chaudhuri
Assistant Examiner—Ourmazd S. Ojan
Attorney, Agent, or Firm—Chenpatents

[57] ABSTRACT

Parts to be cleaned, degreased, or having paint stripped therefrom, by a solvent such as a halogenated hydrocarbon are lowered into and lifted out of a tank via an enclosure disposed above the tank. A pair of doors at the top opening and a second pair of doors at the bottom opening of the enclosure allow isolation of the enclosure from the tank below and from the outside environment above. Parts are lowered into the enclosure with the top doors open and the bottom doors closed. They are then further lowered into the tank for cleaning, degreasing or paint stripping with the top doors closed and the bottom doors open. After cleaning, degreasing or paint stripping, the parts are lifted back into the enclosure and the bottom doors are closed. With both pairs of doors closed, air contaminated with solvent vapor is conveyed from the enclosure to a system for recovering solvent vapor and recovering liquid solvent, such as a refrigerated condenser with a separator, a carbon adsorption system, or an absorption/stripping system using an inert solvent medium such as a hydrocarbon fraction having a boiling point substantially higher than that of the solvent. When the air in the enclosure is solvent-free, the parts are lifted out of the enclosure. No solvent vapors are discharged to atmosphere.

14 Claims, 1 Drawing Sheet

APPARATUS AND METHOD FOR REDUCING SOLVENT VAPOR LOSSES

BACKGROUND OF THE INVENTION

1. Field of Invention

This invention refers to apparatus and a method for reducing the loss of solvent vapors to the atmosphere. More specifically, it refers to apparatus and a process for capturing and recovering for re-use most of the volatile solvent vapors which otherwise would be discharged to the atmosphere from cleaning, degreasing or paint stripping equipment in which the soiled parts to be cleaned or stripped of paint are immersed in liquid solvents, sprayed with liquid solvents, or suspended in solvent vapor for degreasing.

2. Description of Prior Art

Certain volatile halogenated hydrocarbon solvents have outstanding properties for dry-cleaning of fabrics, degreasing of metal parts and electronic circuit boards, and stripping of paints. Examples of such solvents are methylene chloride; 1,1,2-trichloro-1,2,2-trifluoroethane (chlorofluorocarbon 113, or CFC 113); 1,1,1-trichloroethane (TCA, or methyl chloroform); trichloroethylene; and tetrachloroethylene (perchlorethylene). In addition to their excellent cleaning, degreasing and paint stripping properties, these solvents have the great advantage over hydrocarbon, ester, ether and ketone solvents of being non-flammable. These solvents are frequently used in combination with minor amounts of other components added to enhance chemical stability.

The methods used for achieving a high degree of cleanliness in fabrics, metal parts, circuit boards, etc. (hereafter referred to as parts) include immersion of the parts to be cleaned in liquid solvent, spraying of the parts with liquid solvent while they are suspended in air or solvent vapor, or vapor degreasing. A combination of these cleaning techniques is sometimes used. In immersion cleaning, the parts to be cleaned are lowered into a tank containing a bath of liquid solvent and then raised above the liquid level to allow solvent adhering to the parts to drip back into the pool of liquid solvent at the bottom of the tank. Paint stripping is often carried out in this fashion also. In spray cleaning, liquid solvent is pumped through a pipe with connected spray nozzles, and the spray of liquid solvent is directed onto the parts to be cleaned. In vapor degreasing, the liquid solvent at the bottom of the tank is maintained at its boiling point by suitable heating means, e.g. a steam-heated pipe coil or an electrical resistance heating element, and there is provided a layer of solvent vapor in which the parts to be cleaned are suspended. Solvent vapor condenses on the surfaces of the parts until they reach the temperature of the vapor, and the solvent condensate drains by gravity into the pool of liquid solvent at the bottom of the tank. The rinsing action of the condensing solvent thoroughly cleans the surfaces of the parts.

The impurities removed from the parts, such as oil, grease, tar, resins, gums, and pigments from stripped paints, accumulate in the solvent at the bottom of the tank, and when the impurities level has built up to the point where effective cleaning ceases, the impurities-laden solvent is removed from the tank and most of the solvent is recovered by distillation for re-use.

In conventional cleaning, degreasing and paint stripping facilities using open-top tanks, large amounts of solvent vapors are discharged to the atmosphere. In recent years, it has become increasingly apparent that halogenated solvent vapors represent a potential health and environmental threat. Chlorinated hydrocarbon solvents pose a potential health threat to humans and animals through inhalation, skin contact and ingestion via contaminated water. Chlorofluorocarbons discharged into the atmosphere and accumulating in the stratosphere are believed to be responsible for depletion of the protective ozone layer which screens out much solar and cosmic ultraviolet radiation. Trichloroethane, too, is believed to have appreciable ozone depletion potential. Furthermore, volatile halogenated solvent vapors are believed to contribute to global warming due to the "greenhouse effect" caused primarily by the buildup of the carbon dioxide concentration in the Earth's atmosphere, which is feared to cause major climatic disruptions on our planet in the next century.

One approach for dealing with these health and environmental threats is to develop non-hazardous, non-toxic solvent substitutes for the halogenated solvents. Another approach is to develop partially halogenated chlorofluorocarbons whose vapors decompose in the lower atmosphere and which pose no threat to the ozone layer; whether such materials pose a health or greenhouse threat must also be determined. These approaches involve years of costly research and development and the investment in costly new equipment.

Another approach for dealing with the health and environmental problems caused by halogenated solvent vapors is to find means and methods for reducing the discharge of such vapors so the atmosphere to a minimum. Much progress has been made in this respect. In the prior art, dry cleaning solvent vapor is captured on charcoal filters, which are regenerated with steam or hot water; upon cooling, liquid solvent is recovered for re-use. U.S. Pat. No. 4,500,363 describes improved methods for carrying out such solvent recovery.

U.S. Pat. Nos. 4,101,340 and 4,844,743 teach a method whereby, following spray cleaning of parts with liquid solvent in a tank, solvent vapor contained in the air inside the tank may be removed by circulation of this air in a closed circuit through means for condensing and separating such vapors for re-use, whereby the amount of solvent vapor escaping to the atmosphere when the tank is opened for removal of the cleaned parts is substantially reduced.

In vapor degreasing apparatus, methods of reducing the discharge of solvent vapors include the installation of covers on normally open-top degreasing tanks; the installation of water-cooled or refrigerant-cooled pipe coils around the inside periphery of the tank to limit the extent of the solvent vapor layer; and the provision of a "freeboard zone," i.e. an enclosed space above the coils in which a solvent vapor/air mixture, which is heavier than pure air, settles down rather than spill over the top of the tank into the environment while parts are being lowered into and lifted out of the degreasing tank. In addition, workers are instructed to lower the parts to be cleaned into the tank slowly and to raise them slowly after cleaning so as to minimize turbulence, which causes the escape of solvent vapors via the top opening of the tank to the environment.

Despite these measures and precautions, tremendous amounts of solvent vapors continue to be discharged into the atmosphere daily at innumerable cleaning, degreasing and paint stripping installations. For example, vapor degreasers using trichloroethane typically lose 50–90 percent of the solvent used to the atmosphere.

There is an urgent need therefore to provide apparatus and methods for reducing, if not eliminating, such solvent pollution of the air.

It is an object of this invention to provide apparatus, and a method of employing it, by which the discharge of solvent vapors from cleaning, degreasing and paint stripping equipment to the atmosphere is greatly reduced—to 1–2 percent of the solvent used. A further object of this invention is to enable manufactures to continue using halogenated solvents for cleaning, degreasing and paint stripping with minimal discharge of solvent vapors to the atmosphere. An advantage of this invention is that halogenated solvents can continue to be used without adverse health and environmental impact. A further advantage is that existing cleaning, degreasing, and paint stripping equipment can be retrofitted to achieve a large reduction in solvent vapor emissions to the atmosphere.

SUMMARY OF THE INVENTION

The apparatus of this invention comprises an enclosure having openings both at its top and bottom, the enclosure being of sufficient size to accommodate temporarily one batch of parts to be cleaned or degreased at a time. The enclosure may be sealingly connected to the top opening of cleaning, degreasing or paint stripping tanks. Alternatively, new cleaning, degreasing or paint stripping tanks may built with the enclosure as part of the original equipment.

The enclosure further provides a pair of movable doors at its top opening and another pair of movable doors at its bottom opening, these doors being capable of being opened or closed manually or electromechanically. The doors, when closed, isolate the enclosure from the tank below and from the outside environment above. They should be reasonably vapor-tight, though they need not be capable of withstanding any substantial differential pressure.

The movable doors preferably are a pair of sliding panels which slide from opposing sides of the top and bottom openings of the enclosure and meet half-way in the middle. The doors may be rigid panels, vapor-impervious cloth rolled up along the sides of the enclosure in the manner of window shades, hinged elongated sections of rigid material such as thin-gauge sheet metal forming a type of curtain, hinged swinging doors, etc. The term "doors" is used herein to denote all types of closures at the top and bottom of the enclosure.

Connected to the enclosure is a pipe or duct leading to the suction of an exhaust blower which conveys air containing solvent vapors to a system for recovering such solvent vapor, e.g. a refrigerated condenser with a liquid separator; an activated carbon adsorption systems capable of carbon regeneration and liquid solvent recovery; or an absorption/stripping system using an inert solvent medium such as a hydrocarbon fraction having an boiling point substantially higher than that of the cleaning solvent, to facilitate separation of the two solvents by vaporization or distillation.

Ambient air, or air having been freed from solvent vapor, is admitted to the enclosure to replace the solvent vapor mixture with air which is removed from the enclosure by the exhaust blower.

The method of immersion or spray cleaning with liquid solvent, vapor degreasing, and paint stripping by immersion using the improved apparatus of this invention involves the lowering of the parts to be cleaned or stripped of paint, suspended from a cable or wire rope connected to a hoist, into the enclosure and then into the tank, and lifting the parts out of the tank into the enclosure and then into the environment, while the upper and lower pairs of doors are opened and closed so as to entrap air containing solvent vapor, which is conveyed from the enclosure to the system for recovering such solvent vapor for re-use.

DESCRIPTION OF PREFERRED EMBODIMENT OF THE INVENTION

Figure 1:
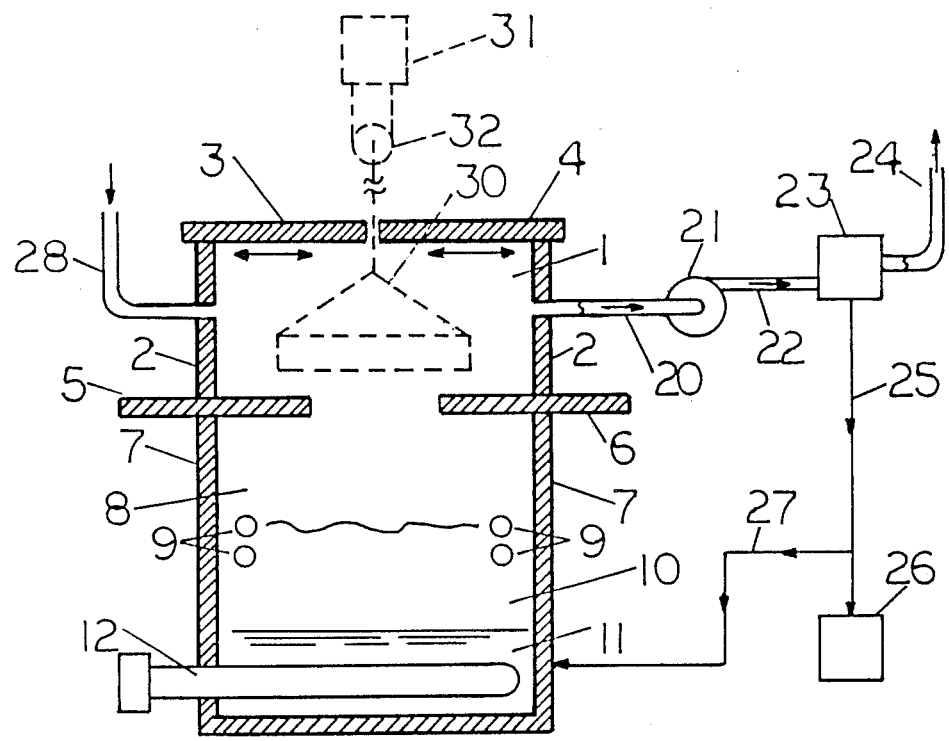
FIG. 1 is a schematic illustration of a preferred embodiment of the apparatus of this invention featuring the enclosure in combination with a degreasing tank and a system for recovering solvent vapor.

With reference to FIG. 1, an enclosure 1 has side walls 2 and a pair of doors 3 and 4 provided near its top opening, and a second pair of doors 5 and 6 provided near its bottom opening. Panel doors sliding from opposite sides of the top and bottom openings of the enclosure 1 and meeting substantially half-way in the middle, at the center of the opening, are preferred. Alternatively the doors may be made of vapor-impervious cloth rolled up along the sides of the enclosure in the manner of window shades, capable of being unrolled to cover the openings of the enclosure; hinged elongated sections of rigid material such as thin-gauge sheet metal forming a type of curtain; or hinged swinging doors. Sliding doors are preferred, especially for the bottom opening of the enclosure, since sliding doors while being opened and closed cause less air turbulence than hinged doors. This minimizes the amount of solvent vapor swept up into the enclosure during the opening and closing of the bottom pair of doors.

The doors 3, 4, 5, and 6 may be opened or closed manually or by remote control by electromechanical means. The doors may be provided with strips of pliable gasket material along their edges so that, when the doors close on the cable or wire rope 21 supporting the parts to be cleaned, a reasonably vapor tight seal is made both along the edges of the doors and around the cable or wire rope.

Means and methods for opening and closing the doors 3, 4, 5 and 6 are known to the art and are not part of the present invention. Similarly, means of reducing air and solvent vapor leakage around the edges of the doors, between the pairs of doors when closed, and around the cable or wire rope supporting the parts to be cleaned, also are known to the art. It will be obvious to those skilled in the art that any gasket and packing materials used on the lower set of doors 5 and 6 must be impervious to traces of solvent vapors which, as is well known, penetrate and embrittle many elastomeric materials. Viton is a generally acceptable gasket material.

The bottom opening of the enclosure communicates with the top opening of the tank 7, the enclosure and the tank forming a unit. When an existing tank is converted into the improved apparatus of this invention, an enclosure of appropriate dimensions is mounted on top of the tank. FIG. 1 shows the enclosure in combination with a vapor degreasing tank. The manner in which the enclosure is combined with a tank for immersion or spray cleaning or for paint stripping is analogous.

Near the top of the tank 7, there is provided around the inside periphery of the tank a set of pipe coils 9, which is cooled during operation with cooling water or refrigerant. Optionally, below the bottom pair of doors 5 and 6 and above the pipe coils 9, a freeboard zone 8 may be provided, whose function is similar to that of the freeboard zone in conventional open-top tanks, i.e. to help reduce the upward transport solvent vapor, as previously explained.

Below the pipe coils 9, there is a vapor zone 10 which, during operation, is filled with pure solvent vapor. Below the solvent vapor zone 10, there is a liquid solvent zone 11 containing liquid solvent maintained during operation at its boiling point by a heating element 12.

Connected at one end to the enclosure 1 via its side wall 2 is a withdrawal pipe 20, connected at its other end to the suction side of an exhaust blower 21, which discharges through a pipe 22 to a system 23 for recovering solvent vapor from air/solvent vapor mixtures and providing recovered liquid solvent for re-use. This system may consist of a refrigerated condenser with a liquid separator, in which the solvent vapor is cooled, condensed, and separated as a liquid from air. The system may consist of a carbon adsorption system, in which solvent vapor adsorbs on activated carbon, which is later stripped of solvent by steam or hot nitrogen, the stripped solvent then being cooled and condensed and the liquid solvent condensate being collected and re-used; the stripping of the solvent from the activated carbon and the recovery of liquid solvent may take place in an integrated system having a plurality of activated carbon vessels, or it may take place at a remote location, in which case the carbon with adsorbed solvent is transported to the remote location in a canister. The system may consist of an absorption/stripping systems employing an inert solvent medium such as a hydrocarbon fraction having a boiling point at least 30 degrees Celsius higher than that of the cleaning solvent; the solvent being absorbed into the inert solvent medium substantially at room temperature and subsequently stripped from the inert solvent medium at elevated temperature, either in a batch or in a continuous system. Such systems are known to the art. Solvent-free air is discharged to the atmosphere via a pipe 24, and recovered liquid solvent flows via a pipe 25 to a storage tank 26 for clean solvent or via a pipe 27 back into the pool of liquid solvent in the liquid zone 11 at the bottom of the degreasing tank.

To replace the solvent vapor mixture with air removed during operation from the enclosure 1 by the exhaust blower 11, fresh air is admitted into the enclosure 1 via pipe 28, connected to the enclosure 1 opposite the connection of pipe 20 to allow thorough purging of the enclosure. Alternatively, solvent-vapor-free air from pipe 24 is recirculated and to this end, pipe 24 may be connected to pipe 28 (interconnection not illustrated).

Parts to be cleaned 30 are lowered into the apparatus and lifted out after cleaning by a hoist system 31 employing a flexible cable or wire rope 32 to support the parts to be cleaned, either directly or by a basket, as is known to the art.

The sequence of operations during the cleaning of parts with a solvent in the apparatus of this invention is illustrated by FIGS. 2a through 2g.

Figures 2A, 2B, 2C, 2D:
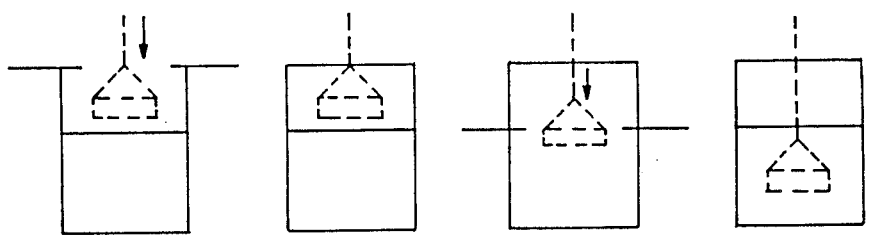
FIGS. 2a through 2g illustrate the sequence of steps used in introducing parts to be cleaned or stripped of paint via the enclosure into a tank and subsequently removing them therefrom.

FIG. 2a shows the parts 19 being lowered into the enclosure 1 via the top opening, with doors 3 and 4 open. FIG. 2b shows the parts 30 suspended in the enclosure 1 with both sets of doors closed. FIG. 2c shows the lower set of doors 5 and 6 open and the parts 30 being lowered into the tank. While the lower pair of doors is open, some solvent vapor is swept up into the enclosure 1 by the turbulence created by the lowering of the parts 30. Hinged doors, while being opened and closed, generate more turbulence than sliding doors. By generating less air turbulence, sliding doors cause less solvent vapor to be swept up into the enclosure and allow the apparatus to operate more efficiently. Sliding doors are therefore preferred to hinged doors.

FIG. 2d shows the parts 30 suspended in the tank with both pairs of doors closed. At this time, the parts are cleaned or stripped of paint by the solvent. Optionally, at this time, the air in the enclosure 1, having been previously contaminated with some solvent vapor, may be conveyed by the exhaust blower 21 to the solvent recovery system 23 for recovering solvent vapor as described above. Alternatively, the contaminated air in the enclosure may be kept isolated at this time without such solvent removal and recovery until later.

Figures 2E, 2F, 2G:
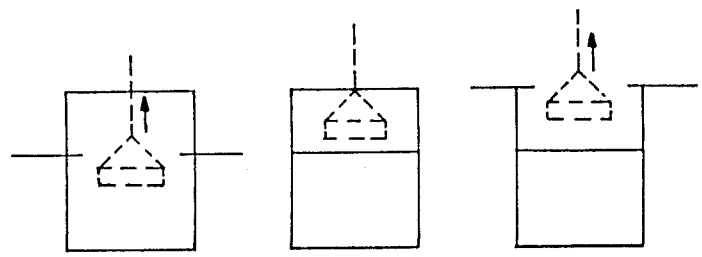

FIG. 2e shows the parts being lifted from the tank. At this time, more solvent vapor air is swept up into the enclosure due to the turbulence caused by the motion of the parts.

FIG. 2f shows the parts suspended in the enclosure 1 with both pairs of doors closed. At this time, the solvent-contaminated air in the enclosure, is conveyed by the exhaust blower 21 to the solvent recovery system 23 and solvent is collected for re-use. Any droplets of liquid solvent adhering to the parts vaporize and the parts are dried. The enclosure 1 at this time is under a very slight vacuum due to the sucking action of the exhaust blower 21 so that any small amount of leakage around the edges of the doors 3, 4, 5 and 6 causes air and solvent vapor flow to the recovery system 23, and no solvent vapor escapes from the apparatus to the surrounding atmosphere.

FIG. 2g shows the parts being lifted out of the enclosure 1. Note that the air in the enclosure, before the upper set of doors 3 and 4 is opened, has been freed of solvent vapor so that, when the air from the enclosure mixes with ambient air as the parts are lifted out of the enclosure, no solvent vapor whatever is discharged to the environment.

It will be appreciated that, with the apparatus and method of this invention, all the solvent vapor which would escape to the atmosphere from conventional solvent cleaning, vapor degreasing or paint stripping equipment is captured and conveyed to the system for recovering solvent. A highly efficient system for recovering solvent vapor, such as carbon adsorption system, may be expected to recover 98–99% of the solvent for re-use. The net loss of solvent vapor thus is cut by a factor of 50–100 with respect to conventional cleaning, vapor degreasing or paint stripping equipment. The following examples will illustrate the benefits of the apparatus and method of this invention.

EXAMPLE 1

Parts are stripped of paint by immersion in liquid methylene chloride at 20 degrees Celsius. The vapor in the tank above the pool of liquid has a partial pressure of methylene chloride of 340 mm Hg, corresponding to a methylene chloride concentration of about 45 percent by volume, the rest being air. The slightest disturbance in the air sends a large amount of methylene chloride vapor via the top opening of the tank into the atmosphere. 70–90 percent of the methylene chloride used for paint stripping may be expected to end up in the atmosphere. By employing the apparatus and method of this invention, the loss of methylene chloride vapor is reduced to about 1 percent of methylene chloride fed to the tank.

EXAMPLE 2

Trichloroethane is used for vapor degreasing of metal parts. The liquid solvent at the bottom of the tank, and the vapor zone above it, are at 74–78 degrees Celsius. A water-cooled pipe coil and a freeboard zone are provided, the coil being at 20 degrees Celsius, and the freeboard zone at 25 degrees Celsius. The trichloroethane vapor concentration in the freeboard zone, corresponding to the saturation vapor pressure of the liquid solvent of 125 mm Hg, may be as high as 16 percent by volume. Fifty percent of the trichloroethane used in the degreaser may be expected to enter the atmosphere via the top opening. By using the apparatus and method of this invention, the loss of trichloroethane vapor is reduced to 0.5–1 percent of the amount of trichloroethane used in the degreasing tank.

Although the invention has been described relative to a specific embodiment thereof, it is not to be limited to such and numerous variations and modifications thereof will be readily apparent to those skilled in the art in the light of the above teachings. It is therefore to be understood that within the scope of the appended claims, the invention may be practiced otherwise than as specifically described.

What is claimed is:

1. Improved apparatus for cleaning, degreasing and paint stripping with solvents which minimizes the emission of solvent vapor to the environment having an open-top tank for holding solvent and a vapor recovery system, wherein the improvement comprises:
   (a) an enclosure having side walls, a top opening and a bottom opening, retrofitted onto said tank;
   (b) a first pair of doors provided at the top opening for opening and sealingly closing the top opening, said doors, when closed, meeting substantially at the center of the top opening and allowing a cable carrying parts to be cleaned to sealingly pass between the doors;
   (c) a second pair of doors provided at the bottom opening for opening and sealingly closing the bottom opening, said doors, when closed, meeting substantially at the center of the bottom opening and allowing a cable carrying parts to be cleaned to sealingly pass between the doors;
   (d) means connected to one of the side walls of the enclosure for conveying a solvent vapor from within the enclosure to the solvent vapor recovery system;
   whereby solvent vapor rising from the tank during the operation or carried upward with the cleaned parts is trapped in the enclosure, removed therefrom, and recovered in a solvent vapor recovery system before the cleaned parts are removed from the enclosure via the top doors.

2. Apparatus in accordance with claim 1 in which the doors are pivotally attached to the enclosure.

3. Apparatus in accordance with claim 1 in which the doors are slidably connected to the enclosure.

4. Apparatus in accordance with claim 1 in which the doors are made of vapor-impervious cloth which is rolled up on rollers along the sides of the top and bottom openings of said enclosure.

5. Apparatus in accordance with claim 1 in which the means for conveying solvent vapor comprises a first pipe connected at one end to a first side wall of the enclosure and at the other end to a blower, a second pipe connected at one end to the blower and at the other end to the system for recovering solvent vapor.

6. Apparatus in accordance with claim 5 further comprising a third pipe, connected to a second side wall of the enclosure to replace solvent vapor conveyed therefrom to the system for recovering solvent vapor, by admission of solvent-free air.

7. Apparatus in accordance with claim 1 in which the system for recovering solvent vapor is a refrigerated condenser with a separator.

8. Apparatus in accordance with claim 1 in which the system for recovering solvent vapor is a carbon adsorption system.

9. Apparatus in accordance with claim 1 in which the system for recovering solvent vapor is an absorption/stripping system using an inert solvent medium having a boiling point substantially higher than that of the solvent.

10. Apparatus in accordance with claim 9 in which the boiling point of the inert solvent medium is at least 30 degrees Celsius higher than that of the solvent.

11. Apparatus in accordance with claim 1 further comprising a pipe coil for cooling, disposed around the inside periphery of the tank below the bottom pair of doors.

12. Apparatus in accordance with claim 11 further comprising a freeboard zone below the bottom pair of doors and above the pipe coil.

13. A method of cleaning parts with a solvent in the apparatus as recited in claim 1 comprising the steps of
   (a) lowering the parts into the enclosure with the bottom pair of doors closed;
   (b) closing the top pair of doors;
   (c) opening the bottom pair of doors and lowering the parts into the tank;
   (d) allowing the parts to be cleaned in the tank;
   (e) lifting the parts into the enclosure;
   (f) closing the bottom pair of doors;
   (g) conveying the air in the enclosure to the system for recovering solvent vapor; and
   (h) opening the top pair of doors and lifting the parts out of the enclosure.

14. A method of cleaning parts in accordance with claim 13 with a solvent selected from the group consisting of methylene chloride, 1,1,2-trichloro-1,2,2-trifluoroethane, 1,1,1-trichloroethane, trichloroethylene, and tetrachloroethylene.

* * * * *